May 23, 1939.     J. H. MOSEL     2,159,509
APPARATUS FOR BUILDING ROADS
Filed April 27, 1937     3 Sheets-Sheet 1

Joseph H. Mosel
INVENTOR.

BY
ATTORNEYS.

May 23, 1939.  J. H. MOSEL  2,159,509
APPARATUS FOR BUILDING ROADS
Filed April 27, 1937  3 Sheets-Sheet 2

Fig.3

Joseph H. Mosel
INVENTOR.

BY
ATTORNEYS.

May 23, 1939. J. H. MOSEL 2,159,509
APPARATUS FOR BUILDING ROADS
Filed April 27, 1937 3 Sheets-Sheet 3

Joseph H. Mosel
INVENTOR.

BY Corbett & Mahoney
ATTORNEYS.

Patented May 23, 1939

2,159,509

UNITED STATES PATENT OFFICE 2,159,509

APPARATUS FOR BUILDING ROADS

Joseph H. Mosel, Columbus, Ohio, assignor to The Jaeger Machine Company, Columbus, Ohio, a corporation of Ohio Application April 27, 1937, Serial No. 139,230

6 Claims. (Cl. 94—40)

My invention relates to apparatus for building roads. It has to do, more particularly, with a machine which is particularly adaptable to building low-cost roads or re-treading roads with such material as bituminous mixtures or other relatively low-cost materials now commonly used. It relates more specifically to a machine for passing through materials previously applied to or forming a part of the surface to be treated and forming therefrom a complete layer or mat.

One of the objects of my invention is to provide a machine which is adapted to form a road surface from material previously applied in front of the machine on the surface to be covered, the machine being adapted to thoroughly mix the material, effectively spread it across the surface to be covered and to form therefrom a layer or mat of the desired thickness and contour and having straight edges, in one pass through said material, although in some cases more than one pass may be desirable.

Another object of my invention is to provide a machine of the type indicated with which it will be possible to use road materials, especially of the bituminous mix type, which will quickly set so as to avoid "picking up" by cars while traffic is maintained, which is made possible because of the fact that a single pass by the machine through the material is ordinarily all that is necessary to form the completed road surface.

Another object of my invention is to provide a machine of the type indicated which is so constructed that material previously dumped on the surface to be covered will be mixed more thoroughly by a single pass of the machine through the material than with a large number of passes with machines of prior art types.

Another object of my invention is to provide a machine of the type indicated which is of such a nature that during its passage through the material, which has been previously dumped on the surface to be covered or forms a part of such surface, the material will be lifted slightly from the surface during the mixing operation, in order to reduce to a minimum the power required to advance the machine through the material.

Another object of my invention is to provide a machine of the type indicated which is so constructed that it may be used for scarifying material already in place on the surface to be treated and which is of such a type that it will mix a suitable binder with such material to stabilize it and will then respread said material, all of said operations being carried on continuously and progressively as the machine advances along said surface.

Another object of my invention is to provide a machine for forming low-cost roads which will form the complete layer or mat with straight edges without the use of expensive side forms that are set along the edges of the surface to be covered.

Another object of my invention is to provide a machine of the type indicated which is particularly adaptable to spreading material over an old road bed or over a roughly graded or other rough surface, the apparatus being of such a nature that the longitudinal irregularities in the surface being covered will be practically eliminated in the surface produced by the machine and, consequently, the machine will produce a surface which is very even and which will not be "wavy."

In its preferred form, my invention contemplates the provision of a machine which is composed of two units that are substantially independent of each other but which are operatively connected together and which operate in conjunction with each other. One of these units embodies a mixing and spreading unit which thoroughly mixes the material, which has been previously applied to or forms a part of the surface to be treated, and which spreads the material across the surface to be covered. This unit thoroughly mixes the material and effectively spreads it ordinarily in one pass through the material. This unit preferably embodies a comparatively narrow mixing chamber which is suspended from the main framework of the machine, having a closed bottom and open front and rear ends. In the mixing chamber, a pair of cooperating longitudinally extending pug mills are disposed which are adapted to thoroughly mix the material that passes into the mixing chamber. At the forward end of the mixing chamber, means is provided for gathering in the material and slightly raising it from the surface to be covered and directing it into the mixing chamber. As the machine advances, the material passes rearwardly through the mixing chamber and finally is discharged on the surface at the rear of the chamber. A transversely extending spreading and mixing member is disposed rearwardly of the mixing chamber and is adapted to spread the material discharged from the mixing chamber laterally and to further mix said material.

The second unit is a finishing or molding unit and embodies a pair of longitudinally extending runners of considerable length which carry a finishing member, which takes the form of a strike-off blade substantially midway between the ends of the runners. This finishing unit is connected to the mixing and spreading unit, the mixing and spreading unit being disposed laterally within the runners, by means of connections which permit the mixing and spreading unit to float vertically relative to the finishing unit and independently thereof. The runners of the finishing unit limit lateral spreading of the material produced by the mixing and spreading unit and, consequently, produce straight edges on the layer of material spread by the machine. The finishing member or strike-off blade carried by the runners operates upon the material previously spread by the transverse spreading and mixing member of the mixing and spreading unit and serves to level said material to the proper thickness and to produce the proper contour on the surface of the layer. Since the finishing member or strike-off member is carried by the long runner members and since the spreading and mixing unit is free to move vertically, as it passes over a rough surface, without causing a corresponding vertical movement of the runners of the finishing unit, the surface produced by the strike-off member will be substantially free from longitudinal irregularities or waves.

This application is a continuation in part of my application, Serial Number 74,059, filed April 13, 1936.

The preferred embodiment of my invention is illustrated in the accompanying drawings wherein similar characters of reference designate corresponding parts and wherein.

Figure 1:
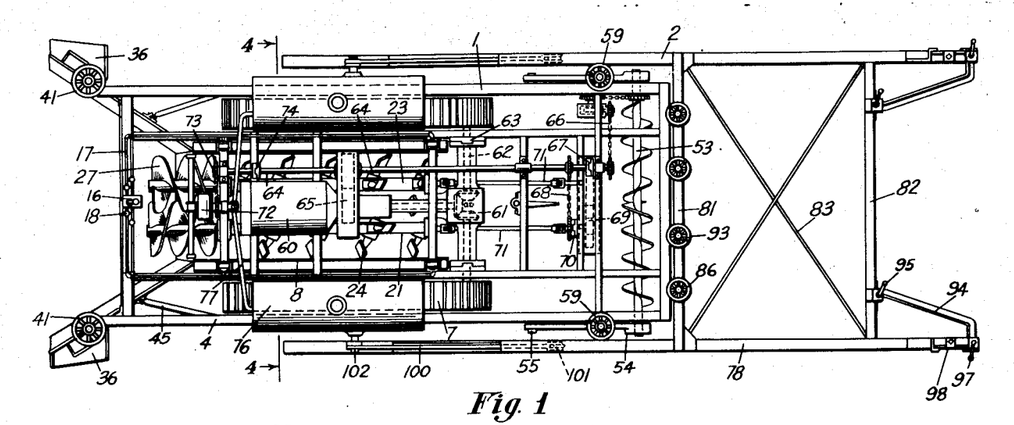
Figure 1 is a plan view of a machine constructed in accordance with the principles of my invention.
Figure 2:
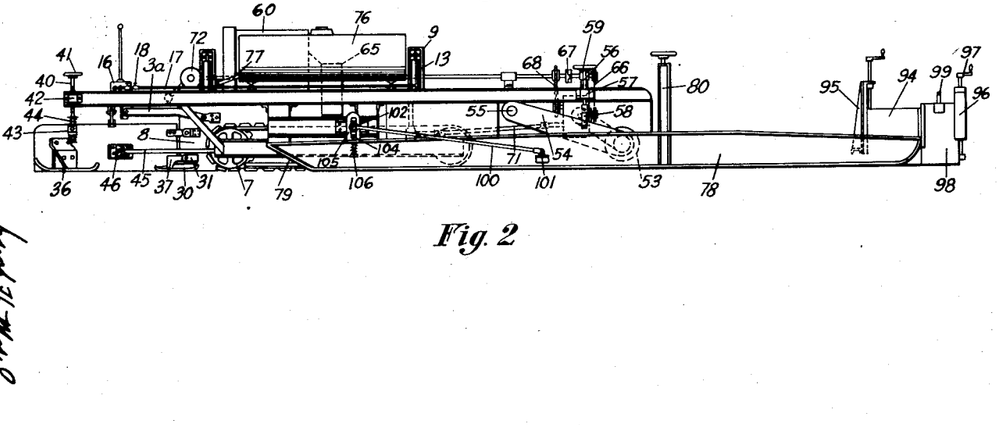
Figure 2 is a side view of the machine illustrated in Figure 1.
Figure 3:
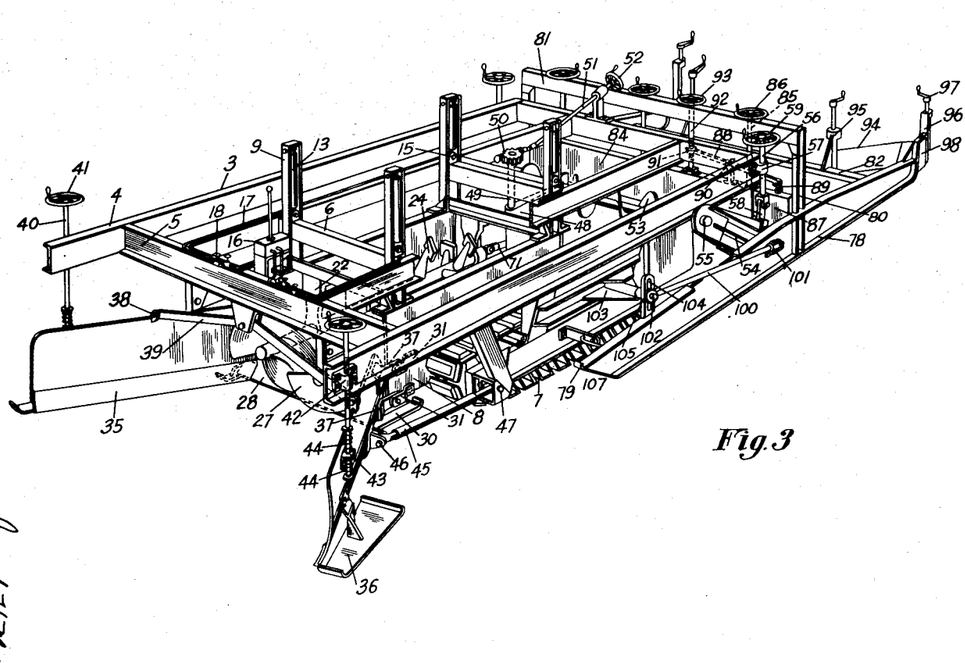
Figure 3 is a perspective view of my machine.

With reference to the drawings, and particularly to Figures 1 to 3, I have illustrated my machine as comprising mainly a mixing and spreading unit 1, and a finishing and molding unit 2. These two units are substantially independent of each other but are operatively connected together and cooperate with each other to produce the finished layer or mat of material. The mixing and spreading unit 1 has its rear end disposed laterally within the finishing or molding unit 2 and extends forwardly ahead of the forward end of said finishing and molding unit, as indicated in the drawings.

The mixing and spreading unit

The mixing and spreading unit 1 comprises a frame 3 which is suitably fabricated of a plurality of longitudinally extending beams 4 and laterally extending beams 5 and 6. This frame is supported by a pair of crawler tractor units 7, one of which is disposed at each side of the frame and is located substantially midway between the ends thereof.

As previously indicated, I provide a mixing chamber on the machine, in which the material, previously dumped on the road surface or already in place and forming a part of such surface, is adapted to pass in order to be thoroughly mixed.

As shown in the drawings, a mixing trough 8 is suspended from the frame. It will be apparent from Figure 4 that this mixing trough is comparatively narrow. It has a closed bottom but open forward and rear ends and an open top. Thus, the material may enter the forward end of this mixing trough and leave through the rear end thereof.

The mixing trough 8 is suspended from the beams 6 of the frame. For this purpose, a vertically extending yoke member 9 is secured, at its lower end, to each corner of the frame 10 of the mixing trough 8. Each yoke member 9 straddles beam 6 and the lower end of the yoke member is pivotally connected to the frame 9, as at 11. Suspended from the upper end of each yoke member 9 by a pivot pin 12 is a hydraulic cylinder 13. A piston rod 14 projects from the lower end of this cylinder and is pivotally connected to the beam 6, as at 15.

Operation of all of the hydraulic cylinders 13 is controlled by means of a hand operated hydraulic pump 16 which is suitably mounted on the frame of the machine. A conduit 17 leads from this pump 16 to each of the cylinders 13. Each conduit may be independently controlled by a valve 18. By means of this hydraulic device, the mixing trough may be vertically adjusted on the frame of the machine. Fluid may be supplied to all the cylinders 13 or exhausted from all of them, simultaneously, in order to vertically adjust the mixing trough to the same extent at all four corners. Furthermore, by a proper adjustment of the valves, fluid may be supplied to or exhausted from any one or more of the cylinders independently of the others. Consequently, with this arrangement, one end of the mixing trough may be raised or lowered independently of the other or the trough may be tilted about its longitudinal axis by adjusting the two hydraulic cylinders at one side of the trough independently of those at the other side. Instead of a hand operated pump 16, a power operated pump could be employed. Also, instead of hydraulic adjusting means, mechanically adjusted means could be employed.

The mixing trough 8 is thus suspended from the frame of the machine. It is suspended substantially midway between the sides of the machine. It extends the greater portion of the length of the frame 3 so that it will take a considerable period for the material to pass therethrough in order that it will be thoroughly mixed. It will be noted from Figure 4 that the mixing trough 8 is disposed between the crawler traction elements 7. In order to guide vertical movement of the mixing trough 8 and prevent lateral swaying thereof, a plurality of rollers 19 are secured to the side walls of the mixing trough. These rollers 19 contact with vertically disposed guide plates 20 which are secured to the crawler tractor elements 7. In order to prevent longitudinal movement of the trough 8 relative to frame 3, it is connected to the frame by drawbars 3a which have one end pivoted to the frame and the other end pivoted to the trough structure (Figure 2).

Figure 4:
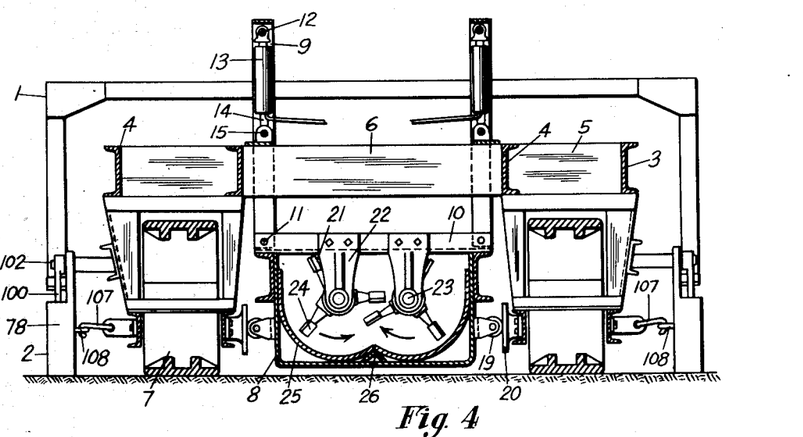
Figure 4 is a transverse section of the machine taken substantially along line 4—4 of Figure 1.

Within the mixing chamber, I provide a pair of longitudinally extending pug mills 21. These pug mills 21 are supported in bearings carried on the lower ends of supports 22 which depend from the frame 10 of the mixing trough into the mixing trough. Each of the pug mills extends the full length of the mixing trough. Each pug mill consists mainly of a rotatable shaft 23 which carries a plurality of radially extending mixing blades 24. The mixing blades are so shaped and are helically arranged so that the material will be forced rearwardly through the mixing trough by means of the pug mills. The two pug mills are adapted to rotate towards each other, as indicated in Figure 4. It will be noted from this figure that the mixing trough has its side walls substantially vertical and has a substantially flat bottom. In order to obtain the proper mixing action and to insure that all material passing through the trough is thorougly mixed, a pair of longitudinally extending transversely curved plates 25 are removably mounted in the mixing trough. These plates 25 are themselves of trough-like form. Each plate is removably secured to the cooperating side wall and to an upstanding support 26 at the middle of the trough 8. These plates are so curved that they correspond substantially to the arc of curvature of the path of the outer ends of blades 24. Thus, this will insure that the blades will thoroughly mix all the material in the trough. The plates 25 may be removed and replaced when necessary because of wear.

The forward end of each pug mill has a forwardly extending screw section 27. Each screw section is formed of a continuous helical blade. The screw sections 27 extend beyond the forward end of the mixing trough 8, as illustrated best in Figure 5, and are adapted to gather in the material and force it rearwardly and upwardly into the mixing trough.

Figures 5, 6:
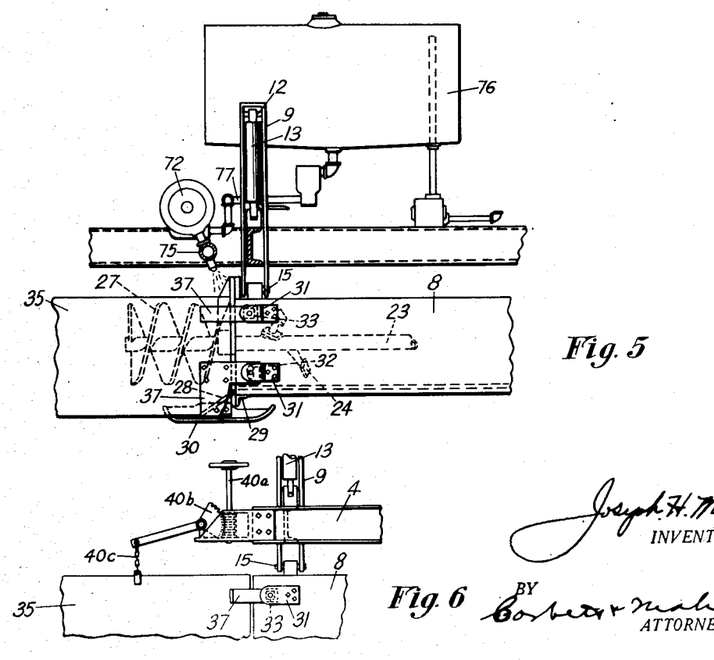
Figure 5 is a detail, partly in section, showing the forward portion of the mixing chamber, the means for causing the material to enter the chamber and the means for applying a binder to the material.
Figure 6 is a detail in side elevation showing a modification of the means employed for suspending the forward end of the gathering wings.

In order to lift the material previously deposited or already in place on the surface to be covered and to carry it rearwardly into the forward end of the mixing trough, I provide a rearwardly and upwardly inclined plate 28. Of course, the material need only be lifted slightly because the bottom of the mixing trough is always close to the surface. The plate 28 extends the full width of the mixing trough 8. Its rear edge always occupies a position above the lower edge of an angle member 29 bolted to the forward edge of the bottom of the mixing trough, as illustrated in Figure 5. The ends of the plate 28 are carried on shoes 30 which slide over the surface to be covered. These shoes 30 are so shaped that they will not dig into the surface. Furthermore, since the plate 28 is carried by these shoes, there will be no danger of the forward edge thereof digging into the surface. The shoes 30 are free to float vertically in accordance with the irregularities of the surface over which they pass and the plate 28 is free to float vertically therewith and relative to the bottom of the mixing trough. However, in all positions, the plate 28 will extend above the lower edge of angle member 29 on the mixing trough.

In order to gather in the material disposed across the surface to be covered and to direct it laterally into the forward end of the mixing trough, I provide a pair of gathering side wing plates 35. These gathering wing plates 35 are arranged as indicated, converging towards each other at their rear ends so as to direct the material into the comparatively narrow mixing trough. The forward end of each wing plate 35 is carried by a removable shoe 36 which, when used, will prevent the forward end of the wing plate from digging into the surface. The rear end of each of the side wing plates 35 overlaps the forward edge of the corresponding side wall of the mixing trough 8. It also overlaps the plate 28 and is adapted to rest thereon. The wing plates and the inclined plate 28 are secured together as a unit. Towards the rear end of each of the side wing plates 35, brackets 37 are rigidly connected thereto adjacent the upper and lower edges thereof. The lower bracket 37 (Figure 5) is connected to a lower bracket 31, which is rigidly secured to the side wall of the mixing trough, by means of a pin carried by bracket 31 which operates in a vertical slot 32 formed in the lower bracket 37. Thus, this connection will permit vertical floating of the lower bracket 37 relative to the bracket 31. The upper bracket 37 is connected to an upper bracket 31, which is rigidly secured to the side wall of the mixing trough, by means of a pin carried by bracket 31 which operates in a large square opening 33 formed in the upper bracket 37. Thus, this connection will permit both vertical movement of upper bracket 37 relative to bracket 31 and longitudinal movement of bracket 37 relative to bracket 31.

It will be apparent that the rear end of the unit embodying wing plates 35 and inclined plate 28, is connected to the forward end of the mixing trough, in such a manner that the unit is free to float relative to the trough. Furthermore, because of the floating connection, the trough may be adjusted to a certain extent without affecting the said unit. However, if the trough is raised to a considerable extent for transportation, the rear end of the said unit will be raised with it.

The wing plates are secured to the main frame 3 by means of bars 39 pivoted to the frame and pivoted to the upper edge of the wing plates as at 38. The forward end of each of the wing plates 35 is adjustably secured to the extreme forward end of one of the beams 4 of the frame which extends forwardly a considerable distance from the main portion of the frame. For this purpose, a shaft 40 which may be rotated by a hand wheel 41 is threaded through a bearing 42 secured to the end of the beam 4. The lower end of the shaft 40 passes through an opening in a bracket 43 secured to the wing plate. Cushioning springs 44 are provided in surrounding relation to the shaft, above and below the bracket, in order to permit vertical floating movement of the wing plate 35. A thrust rod 45 is pivotally connected at its forward end, as at 46, to the side wing plate. The rear end of this rod is pivotally connected, as at 47, to the crawler unit 7. This thrust rod serves to brace the side wing plate to resist the force caused by movement of the wing plates into the material on the surface to be covered.

It will be apparent that the gathering wings 35 will gather in the material and direct it inwardly and rearwardly as the machine moves through such material. When it reaches a point adjacent the forward end of the mixing trough, the screw sections 27 of the pug mill will force the material rearwardly and upwardly over the inclined plate 28 into the bottom of the mixing trough. The material will pass rearwardly through the mixing chamber and will be thoroughly mixed by the pug mills. The unit embodying gathering wings 35 and the plate 28 will float vertically independently of the mixing trough 8. Furthermore, the mixing trough 8 may be adjusted vertically as required under normal operations without affecting the position of the plate 28 and the gathering wings 35. With this structure, the lower and forward edge of the plate 28 will adways lie close to the surface upon which the material rests. This will insure that all the material will be scooped up and lifted into the mixing trough. The same is true of the gathering wings 35.

If desired, shoes 36 may be removed so that the wings 35 will dig into the loose material. This will be desirable when the machine is employed to scarify relatively loose material disposed on the surface to be treated and to mix said material with a suitable binder in order to stabilize it. The machine will scarify the material, pick it up, mix it with a binder, and then spread it as the machine advances along the surface to be treated. The machine will gather the material to a predetermined depth at which the gathering wings are cutting off the material which is already on the surface. This depth will vary with the setting of the forward ends of the gathering wings.

In Figure 6, I show different means for suspending the forward end of the gathering wings. In this instance, I provide a rotatable shaft 40a mounted on the forward end of the main frame. This shaft 40a has a worm on its lower end which meshes with a segment 40b which is pivoted to the frame as indicated. The segment 40b has a forwardly extending arm to which the upper end of a chain 40c is suitably connected. The lower end of the chain is suitably connected to the upper end of the gathering wing 35. It will be apparent that rotation of shaft 40a will swing segment 40b about its pivot and will, consequently, raise or lower the forward end of the gathering wing.

At the rear end of the mixing trough, I provide means for diverting the material to one side or the other, if desired, as it is discharged from the mixing trough. This means comprises a rudder member 48 which is supported on a pivot shaft 49 depending from the rear transverse beam 6 of the frame 3. By rotating the shaft 49, the rudder member 48 may be swung laterally. The rudder member embodies a vertically disposed plate which is of substantially the same height as the side walls of the mixing trough. The rudder member may be swung about its pivot and held in locked position by means of a worm and gear unit 50 operated by a rearwardly extending shaft 51 which may be turned by a hand wheel 52. By means of this rudder 48, the amount of material which is fed to either side of the surface being covered after it leaves the mixing trough, may be controlled and varied at will.

When the material leaves the mixing trough, it is thoroughly mixed. It is deposited on the surface to be covered at a point behind the mixing trough. In order to spread this material as the machine moves along, I provide a transversely extending mixing and spreading member 53 which is located behind the mixing trough substantially at the extreme rear end of the mixing and spreading unit. This member 53 is adapted to spread the material discharged from the mixing trough across the surface to be covered. It will be noted that this member extends for the full width of the mixing and spreading unit. The mixing and spreading member 53 is composed of right and left hand screw spreading sections which feed the material towards the right and left, respectively.

The member 53 is rotatably mounted in the rear and lower end of arms 54 disposed at each side of the machine. The forward and upper end of each of these arms is pivotally connected at 55 to the frame 3. In order to vertically adjust the ends of the mixing and spreading member 53, I provide a rotatable shaft 56 which is threaded through a bearing 57 secured to the frame. The lower end of this shaft 56 is pivotally connected to a link 58 which is pivotally connected to the arm 54. By means of a hand wheel 59, the rear end of the arm 54 may be raised or lowered in order to raise or lower the corresponding end of the member 53. Either end of the member 53 may be vertically adjusted independently of the other.

The pug mills 21, the member 53 and the crawler unit 7 are all power-driven. For this purpose, a suitable engine 60 is carried by the frame. This engine 60 drives a rearwardly extending shaft which drives a differential unit 61 connected by shaft 62 to the crawler 7. Each shaft 62 has a clutch 63 associated therewith. Thus, the tractor elements may be driven simultaneously or by means of selectively operating the clutches 63, one crawler element may be driven while the other remains stationary, in order that the machine may be steered.

The engine 60 also drives a longitudinally extending shaft 64 by means of a gear unit 65. At its rear end, this shaft 65 is connected by a sprocket and chain drive 66 to the member 53 in order to rotate said member. A clutch 67 is associated with shaft 64 so that the drive to the member 53 may be rendered inoperative, if desired.

The shaft 64 is also connected by a sprocket and chain drive 68 to a gear unit 69, a clutch 70 being interposed in this drive. By operating clutch 70, the driving connection with gear unit 69 may be broken. The gear unit 69 drives a pair of forwardly extending shafts 71 which are connected to the rear ends of the pug mills 21.

The forward end of the shaft 64 also drives a pump 72 by means of a sprocket and chain drive 73. The pump 72 is disposed at the forward end of the frame 3, as provided for a purpose to be explained. A clutch 74 is associated with the shaft 64 in order that the drive for the pump 72 may be rendered inoperative, if desired.

It will be apparent that with this power system, the machine may be moved along and guided. While the machine is moving, all of the units may be rendered inoperative, if desired, by properly operating the various clutches. The pug mills and the member 53 may operate simultaneously or they may be rendered inoperative independently of each other.

In order to supply bitumen or other binder to the material entering the forward end of the mixing trough 8, I provide means mounted on the frame 3 and including the pump 72 previously referred to. The pump 72 has a depending nozzle 75 connected thereto (Figure 5) which is located between the two sections 27 of the pug mills and substantially at the forward edge of the mixing trough. Thus, as the material is taken into the mixing trough, the bitumen is applied thereto. It will be thoroughly mixed with the material during its passage through the trough.

Bitumen is supplied to the pump 72 from a pair of tanks 76. One of these tanks is located at each side of the machine. Both tanks are connected to the pump by conduits 77. The pump 72 will withdraw bitumen from both of the tanks simultaneously. Thus, since the same amount of material will be drawn from each tank, the machine will be kept in balance. In some cases, it may be desirable to apply the bitumen to the material at a point in front of the machine by an independent unit. In such case, it will not be necessary to use the unit which I have provided on the machine for this purpose.

The finishing and molding unit

The finishing and molding unit 2 comprises a pair of longitudinally extending runners 78. These runners are comparatively long so that they will slide over a rough surface and will bridge the irregularities thereof and, consequently, will not move vertically to any considerable extent. These runners are adapted to serve as side forms to limit spreading of material by the unit 1. They are adapted to form straight edges on the layer or slab produced by the machine. Each runner 78 embodies a vertically disposed plate with a flat runner surface on its lower edge. Its forward edge is upturned as at 79 so that it will not dig into the surface over which it slides.

The runner members are spaced apart sufficiently to permit the rear end of the mixing and spreading unit 1 to be disposed therebetween. They extend forwardly a considerable distance past the rear end of the mixing trough 8 and overlap the side walls thereof. Substantially midway between the ends of the runners vertical supports 80 are rigidly secured thereto. The upper ends of these supports 80 are joined together by means of a transversely extending beam 81. Thus, the members 80 and 81 serve to join the two runner members together. Adjacent the rear ends of the runners a transversely extending beam 82 is provided for joining them together. Diagonal reinforcing members 83 are also provided adjacent the rear ends of the runners. Thus, the runners will be rigidly held in spaced relation and parallel to each other.

The runner members 78 are adapted to carry a member which finishes the surface produced by the machine. This member is carried substantially midway between the ends of the runners. Since the finishing member is carried by the runners which bridge the irregularities in the surface over which they operate, the irregularities in the rough surface will not be reflected in the surface produced by the machine.

The finishing member carried by the runners comprises a strike-off blade or screed 84. This strike-off blade is suspended from the beam 81 by means of shafts 85, one of which is disposed adjacent each end thereof. Each of the shafts 85 is rotatable by a handwheel 86 and is connected to the strike-off blade 84 in such a manner that upon rotation thereof, the end of the strike-off blade will be moved vertically. This may be accomplished by having the lower end of the shaft threaded into a member carried by the strike-off blade. Thus, either end of the strike-off blade may be adjusted independently of the other. The lower edge of the strike-off blade is provided with any suitable means (not shown) for varying the crown of the surface finished thereby. The mixing and spreading unit 1 is so disposed relative to the finishing and molding unit 2 that the strike-off blade 84 is disposed directly behind the spreading and mixing member 53.

The strike-off blade 84 has vertically adjustable gates 87 disposed adjacent each end thereof. These gates 87 are slidably mounted in suitable guides on the strike-off blade for vertical adjustment relative thereto. When the strike-off blade is vertically adjusted, the gates 87 will move therewith. However, the gates are also capable of independent vertical adjustment relative to the strike-off blade. To accomplish this, a link 88 has its outer end pivotally connected at 89 to the upper edge of the gate 87. Intermediate its ends the link is pivotally connected at 90 to a bracket on the upper edge of strike-off blade 84. Its inner end is pivotally connected at 91 to a block through which the lower end of a shaft 92 is threaded. The shaft 92 may be rotated by means of a handwheel 93. It will be apparent that when handwheel 93 is rotated, the link 88 will pivot about the point 90 and will raise or lower the gate 87 relative to the strike-off blade. The gates at the end of the strike-off blade are provided to permit material to bleed rearwardly past the ends thereof when desired.

At the extreme rear end of each of the runners 78, an adjustable blender wing 94 is disposed. One end of the wing 94 is mounted for vertical movement in a support 95 secured to beam 82. The other end is mounted for vertical movement in a support 96 secured to the rear end of the runner. These blender wings extend outwardly and rearwardly as indicated. Each end of the blender wing may be adjusted by means of a screw adjustment 97. On each support 96 a vertically adjustable gate 98 is disposed in front of the blender wing 94 in order to permit material to bleed out laterally past the runner 78. This gate 98 may be adjusted by means of a screw adjustment 99.

The gates 87 at the ends of the screed member and the blender wings 94 are provided mainly for use when the machine lays the road surface in two or more lanes. When the first lane is laid they are not used. However, after the first lane is laid and a second lane is being laid adjacent thereto, the blender wing at that side where the edges of the two lanes meet is used in order to obtain a perfect joint between the two lanes. The gate 87 at that side is raised to permit a quantity of material to feed past the end of the strike-off blade. The blender wing 94 at that side then spreads such material laterally behind the runner member and levels off said material, producing a proper joint between the two lanes.

The means for connecting the two units together

The mixing and spreading unit 1 is connected to the finishing and molding unit 2 in such a manner that the mixing and spreading unit may move vertically without having any effect whatsoever on the unit 2. In other words, the unit 1 is free to float vertically relative to the unit 2. It will be apparent that vertical movement of the mixing and spreading unit 1 will be minimized because of the fact that I provide crawler units 7 which are located midway between the ends of the unit and because of the fact that the crawler units will operate upon the surface being covered rather than upon the material applied to said surface. The paths over which the crawler units 7 operate will be cleared of the material by the gathering wings 35. The surface being covered is sometimes comparatively rough and is usually wavy. It is desirable that vertical movement of the mixing and spreading unit resulting from rough and wavy conditions of said surface be precluded from effecting corresponding vertical movement of the strike-off blade carried by the finishing and molding unit. Consequently, as previously stated, I provide connections between the mixing and spreading unit 1 and the molding and finishing unit 2 which permit relative floating movement between these two units.

The main elements for connecting these two units together comprise pull rods 100 disposed at each side of the machine. The rear end of each of these rods is pivotally connected to the runner member adjacent the point where the strike-off member is located as at 101. This rod extends forwardly almost to the forward end of the runner where it is pivotally connected to the spreading and mixing unit. It is pivotally connected to a pin 102 which is supported by a support 103 extending laterally from the frame 3. The outer end of the pin 102 is free to move vertically in a slot 104 formed in a bracket 105 secured to the runners. A cushion spring 106 (Figure 2) is provided for cushioning vertical movement of the pivot pin 102. It will be apparent that as the mixing and spreading unit 1 moves along, it will pull along the finishing unit 2 by means of the pull rods 100. Furthermore, it will be apparent that with this connection, the mixing and spreading unit may move vertically without affecting the molding and finishing unit.

I provide means for preventing relative lateral movement between the two units. As shown best in Figure 4, this means comprises a plurality of hooks 107 which are connected to the outer portion of the crawler units 7. These hooks 107 cooperate with loops 108 secured to the inner surfaces of the runners. It will be apparent that these hook connections between the mixing and spreading unit and the runner unit will prevent relative lateral movement between these two units. This will insure that the runners will function to produce straight edges on the road. However, it will be apparent that these connections will not interfere in any way with the floating action between the two units.

The operation of the entire machine

As previously indicated, this machine is particularly useful in mixing and spreading bituminous mixes and forming therefrom a complete layer or mat. In using the machine, the aggregate material is dumped in windrows, or roughly spread in front of the machine on the surface to be covered, or the machine will operate on material already in place and forming a part of the surface to be treated. The machine is then adjusted so that the mixing trough 8 will be at the proper height and the gathering wings 35 will properly contact with the surface to be covered. The mixing and spreading member 53 is adjusted vertically to the proper height and the strike-off blade 84 is adjusted vertically to the proper extent to produce a layer of material of the desired thickness. It will be noted that the strike-off blade 84 is located directly behind the mixing and spreading member 53. If desired, the members 53 and 84 may be tilted laterally. The power controls are then properly operated to cause the machine to move through the material. The pug mills, the mixing and spreading member 53 and the bitumen pump 73 are all preferably operated simultaneously as the machine starts to advance through the material.

As the machine advances, the gathering wings 35 will be the first members to strike the material. These gathering wings gather in the material and direct it towards the forward open end of the mixing trough 8. The gathering wings also serve to clear paths for the crawler units 7. As the material nears the forward end of the mixing trough, it will be engaged by the screw sections 27 of the pug mills which will force it rearwardly up the inclined plate 28 into the forward end of the mixing trough. The mixing trough is comparatively narrow so that the material will be constricted and will, therefore, be more thoroughly mixed since it will be concentrated into a narrow but deeper mass. The two longitudinally extending pug mills will thoroughly mix the material while it is in the mixing trough and will feed it rearwardly through the mixing trough. The material will drop from the rear end of the mixing trough onto the surface to be covered at a point behind the crawler units 7. As the machine advances the mixed material will be engaged by the spreading and mixing member 53 which will spread it laterally across the surface to be covered and will also further mix the material. The amount of material supplied to each side of the surface to be covered may be governed by means of the rudder 48 which will determine the amount of material fed to the respective right and left hand screw spreading sections of the member 53.

As previously stated, as the material enters the mixing trough 8, bitumen or other suitable binder is sprayed thereon by means of the nozzle 75 connected to the pump 72. This bitumen is thoroughly mixed with the material during its passage through the mixing trough.

As the machine continues to advance, the strike-off blade 84 will act upon the material spread laterally across the surface by the member 53. The strike-off blade is disposed directly behind the member 53. The strike-off blade levels off the material to the proper thickness and imparts the proper crown thereto. The runners 78 of the finishing unit serve as side forms to limit lateral spreading of the material and to form straight edges on the layer or mat of material produced by the machine. The mixing and spreading unit may move vertically, because of the fact that the crawlers 7 operate on the surface being covered which may be rough, but the vertical movement of this unit will have no effect on the finishing unit which carries the strike-off blade. Consequently, the irregularities of the surface which is being covered will not be transmitted to the surface produced by the machine.

Although I have described my machine as being particularly useful for mixing and spreading bituminous mixes, it will be apparent that it may be employed for mixing and spreading other material. It will operate upon any relatively loose material disposed on the surface in front of the machine.

From the above description, it will be seen that I have provided a machine which is adapted to form a road surface from material disposed in front of the machine on the surface to be treated or forming a part of such surface. The machine will thoroughly mix the material, effectively spread it across the surface to be covered and will form therefrom a layer or mat of the desired thickness and contour and having straight edges, ordinarily in one pass through said material. The material mixed by the machine is lifted slightly from the surface upon which it is disposed in order to reduce to a minimum the amount of power required for advancing the machine through the material. However, it is lifted to a point only slightly above said surface in order to eliminate the necessity of providing complicated means for feeding the material into the mixing trough. Consequently, the machine is substantially a "mix-in-place" machine.

The machine is of such a nature that it is particularly useful in forming low-cost roads, since it will form a complete layer or mat with straight edges without the use of expensive side forms that are set along the edges of the surface to be covered. It is particularly applicable to the spreading of material over an old road bed or over a roughly graded or other rough surface because it is of such a nature that the longitudinal irregularities in the surface being covered will not appear in the surface produced by the machine and, consequently, the machine will produce a surface which is very even and which will not be wavy.

Many other advantages will be apparent from the preceding description, the drawings and the following claims.

Although in the following claims I use the term "strike-off blade", it is to be understood that I intend to cover screed members and other surface finishing members.

Having thus described my invention, what I claim is:

1. A road-building machine comprising a frame, a longitudinally extending mixing compartment carried by the frame, a longitudinally extending rotatable mixing member disposed in said compartment, a rotatable screw spreading member carried by said frame for spreading material discharged from said mixing compartment, and means for vertically adjusting said screw spreading member, said screw spreading member being so disposed that as the machine moves along it will contact with the material previously discharged from the rear end of said mixing compartment.

2. A road-building machine comprising a runner unit embodying a plurality of laterally spaced longitudinally extending runner members that slide along the surface to be covered and bridge the irregularities thereof, a mixing and spreading unit carried by transporting means, a longitudinally extending mixing trough carried by said mixing and spreading unit, said mixing trough having its forward and rear ends open so that material will pass into the forward end thereof and leave through the rear end thereof as the machine advances through the material, a longitudinally extending rotatable mixing chamber disposed in said trough, said mixing member being adapted to mix the material entering the trough and to feed it rearwardly through the trough, a spreading member supported on said mixing and spreading unit at a point behind the rear end of said mixing trough and adapted to spread the material which leaves the rear end of said trough laterally across the surface to be covered, said runner members being so disposed as to limit spreading of material produced by said spreading member, a strike-off blade carried by said runner unit, said strike-off blade being disposed behind said spreading member so that it will operate upon material spread thereby, and means for tying said units together and preventing substantial lateral movement therebetween, said means permitting free vertical movement of the mixing and spreading unit relative to the runner unit so that vertical movement of the mixing and spreading unit caused by the transporting means operating over a rough surface will not be transmitted to said runner unit.

3. A road-building machine comprising a runner unit embodying a plurality of laterally spaced longitudinally extending runner members that slide along the surface to be covered and bridge the irregularities thereof, a mixing and spreading unit carried by transporting means, a longitudinally extending mixing trough carried by the mixing and spreading unit, said mixing trough having its forward and rear ends open and being supported so that its bottom is slightly above the surface to be covered, means for directing material into the forward end of the trough as the machine advances through the material, a longitudinally extending rotatable mixing member disposed in said trough, said mixing member being adapted to mix the material entering the trough and to feed it rearwardly through the trough so that it will be discharged from the rear end thereof onto the surface to be covered, a transversely extending rotatable spreading member carried by the mixing and spreading unit at a point behind the rear end of said trough and adapted to operate upon the material discharged from said trough, said runner members being so disposed as to limit spreading of material produced by said mixing and spreading unit, a strike-off blade carried by said runner unit, said strike-off blade being disposed behind said rotatable spreading member so that it will operate upon material spread thereby, and means for tying said units together and preventing substantial lateral movement therebetween, said means permitting free vertical movement of the mixing and spreading unit relative to the runner unit so that vertical movement of the mixing and spreading unit caused by the transporting means operating over a rough surface will not be transmitted to said runner unit.

4. A road-building machine comprising a runner unit embodying a plurality of laterally spaced longitudinally extending runner members that slide along the surface to be covered and bridge the irregularities thereof, a mixing and spreading unit carried by transporting means, a longitudinally extending mixing trough carried by the mixing and spreading unit, said mixing trough having its forward and rear ends open and being supported so that its bottom is slightly above the surface to be covered, means for directing material into the forward end of the trough as the machine advances through the material, a plurality of cooperating longitudinally extending rotatable mixing members disposed in said trough, said mixing members being adapted to mix the material entering the trough and to feed it rearwardly through the trough so that it will be discharged from the rear end thereof onto the surface to be covered, a transversely extending rotatable spreading member carried by the mixing and spreading unit at a point behind the rear end of said trough and adapted to operate upon the material discharged from said trough, said runner members being so disposed as to limit spreading of material produced by said mixing and spreading unit, a strike-off blade carried by said runner unit, said strike-off blade being disposed behind said rotatable spreading member so that it will operate upon the material spread thereby, and means for tying said units together and preventing substantial lateral movement therebetween, said means permitting free vertical movement of the mixing and spreading unit relative to the runner unit so that vertical movement of the mixing and spreading unit caused by the transporting means operating over a rough surface will not be transmitted to said runner unit.

5. A road-building machine comprising a frame, a mixing trough carried by said frame so that its bottom is spaced slightly above the surface to be covered, an inclined plate disposed at the forward end of said mixing trough and adapted to raise the material into said trough as the machine advances therethrough, gathering wings for gathering in the material and directing it laterally inwardly into the forward end of the mixing trough, said inclined plate and gathering wings being connected together as a unit, said unit being connected to the machine in such a manner that both its front and rear ends are free to float relative to the mixing trough.

6. A road-building machine comprising a frame, a mixing trough on said frame, said trough being substantially rectangular in cross section, a rotatable mixing member disposed in said trough and extending longitudinally thereof, said rotatable mixing member having radially extending blades, and a removable plate disposed in said mixing trough and extending longitudinally thereof, said removable plate being curved transversely substantially to the arc of curvature of the path followed by the outer ends of said blades.

JOSEPH H. MOSEL.